US009864789B2

(12) United States Patent
Nowakowski et al.

(10) Patent No.: US 9,864,789 B2
(45) Date of Patent: Jan. 9, 2018

(54) METHOD AND SYSTEM FOR IMPLEMENTING AN ON-DEMAND DATA WAREHOUSE

(71) Applicant: Oracle International Corporation, Redwood Shores, CA (US)

(72) Inventors: David Wayne Nowakowski, Thornton, CO (US); Scott Gene Buss, Centennial, CO (US); John David Bilthuis, Highlands Ranch, CO (US); Pradip Kumar Pandey, Highlands Ranch, CO (US); George R. Pogmore, Greenwood Village, CO (US); John David Holder, Centennial, CO (US)

(73) Assignee: Oracle International Corporation, Redwood Shores, CA (US)

( * ) Notice: Subject to any disclaimer, the term of this patent is extended or adjusted under 35 U.S.C. 154(b) by 464 days.

(21) Appl. No.: 14/247,993

(22) Filed: Apr. 8, 2014

(65) Prior Publication Data

US 2014/0304217 A1 Oct. 9, 2014

Related U.S. Application Data

(60) Provisional application No. 61/809,863, filed on Apr. 8, 2013.

(51) Int. Cl.
*G06F 17/00* (2006.01)
*G06F 17/30* (2006.01)

(52) U.S. Cl.
CPC .............................. *G06F 17/30563* (2013.01)

(58) Field of Classification Search
None
See application file for complete search history.

(56) References Cited

U.S. PATENT DOCUMENTS

| 7,904,472 B1* | 3/2011 | Karnik | G06F 17/30306 707/779 |
|---|---|---|---|
| 8,726,179 B2* | 5/2014 | Yerkes | G06F 17/30581 705/7.18 |
| 2005/0216497 A1* | 9/2005 | Kruse | G06Q 10/00 |
| 2009/0187530 A1* | 7/2009 | Nair | G06F 17/30386 |
| 2010/0257136 A1* | 10/2010 | Velozo | G06F 17/30592 707/602 |
| 2012/0047169 A1* | 2/2012 | Schroeder | G06F 17/30578 707/770 |
| 2014/0047040 A1* | 2/2014 | Patiejunas | H04L 51/24 709/206 |
| 2015/0012512 A1* | 1/2015 | Lam | G06F 17/30554 707/706 |
| 2015/0088578 A1 | 3/2015 | Nowakowski et al. | |

\* cited by examiner

*Primary Examiner* — Augustine K Obisesan
*Assistant Examiner* — Lahcen Ennaji
(74) *Attorney, Agent, or Firm* — Vista IP Law Group (57) ABSTRACT

Disclosed are methods and apparatuses for reducing the number of database calls when transferring data from a database to a server. One embodiment provides an approach for utilizing staging tables to collate and transform core data and related data in the database before transferring the data to the server, so that the number of database calls used may be reduced.

33 Claims, 8 Drawing Sheets

METHOD AND SYSTEM FOR IMPLEMENTING AN ON-DEMAND DATA WAREHOUSE

CROSS-REFERENCE TO RELATED APPLICATIONS

The present application claims the benefit of priority to U.S. Provisional Application No. 61/809,863, entitled "ON DEMAND DATA WAREHOUSE", filed on Apr. 8, 2013, which is hereby incorporated by reference in its entirety.

BACKGROUND

In many different data systems, such as in an Enterprise Resource Planning (ERP) system, data may be stored in multiple tables and locations within a database. Processing data in these systems often involves processing both core data and multiple other data sources (such as tables, views, etc.) related to the core data. One or more of the data items may be stored in a data warehouse.

For example, consider the need for an effective ERP system to manage product and project developments. As short-lived market opportunities present themselves, product development efforts that once required years now must be executed in a matter of months. Many project executives are tasked with managing an entire portfolio of complex projects, which presents challenges and difficulties to effectively implement and manage the projects. It is therefore essential for the project managers to be able to understand and assess the state of their business at any point in time. The need goes well beyond making sure projects complete on time and on budget. Ultimately, for companies to thrive, the project portfolio needs to be profitable. In order to achieve this, executives need to have their finger on the pulse of numerous project data elements such as budgets, actuals, forecasts, open commitments, invoices, and cash received.

For project managers and project executives, there is not just one view of a project. Since projects have many different stakeholders involved, one needs to be able to view a project or series of projects with one view, focusing on the financial information pertinent to one set of stakeholders, and then quickly go to another view, and focusing on the financial information pertinent to another set of stakeholders, of that same set of projects.

However, when trying to present a view of data sourced from dozens of different tables within an ERP system, performance becomes a major concern. When that data extends to hundreds of thousands of records, traditional approaches to processing data may fail to perform adequately.

Therefore, there exists a need for a system for retrieving core data and related data having better performance.

SUMMARY

The present invention presents improved methods, systems, and computer program products for retrieving core data and related data views from a database server to a logic server.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of enterprise resource planning ("ERP") applications. It is noted, however, that the invention is not limited in its scope to ERP applications, and indeed, may be applied to other types of applications as well.

As noted above, when an application attempts to present a view of data sourced from many different tables within an ERP system, performance becomes a major concern. When that data extends to hundreds of thousands of records, traditional approaches to processing data may fail to perform adequately. For example, consider a "data warehouse" that integrates data from multiple disparate sources to create a central repository for the data. An application server may seek to integrate large numbers of data items from disparate sources, which effectively results in an "on-demand" data warehouse. However, traditional solutions are unable to efficiently create the on-demand data warehouse, since conventional approaches require excessive amounts of computing and/or networking overhead to gather and integrate the data from the backend database sources.

Figure 1:
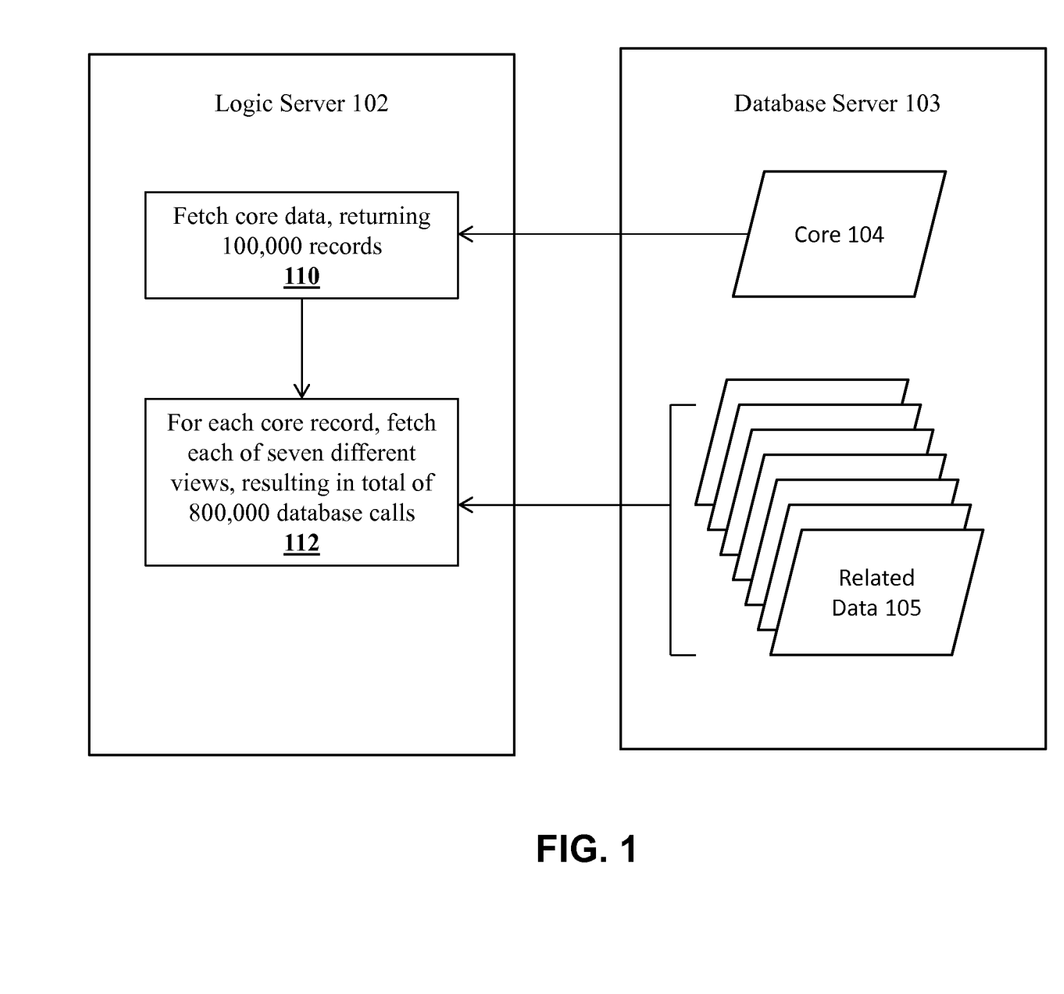
FIG. 1 illustrates an example of a system for retrieving core and related data from a database.

To illustrate this problem, consider the approach shown in FIG. 1 for retrieving core and related data from a database server to an ERP application on a logic server. Database server 103 contains both core data 104 and related data 105, e.g., comprising data views for the core data 104. In this illustrated example, related data 105 comprises seven additional database views for core data 104 although it is noted that any number of additional data sources may exist for the core data 104. For example, core data 104 may comprise employee information, while the related data 105 may comprise additional data such as employee position, location, office phone number, email, salary, benefits, and performance reviews, etc. These views in related data 105 may be data stored in separate tables, or may be different views of the same table.

When the logic server 102 retrieves core data 104 from database server 103, it may also need to retrieve corresponding records from each of the additional seven views in related data 105 for each record of the core data 104 retrieved. The retrieved core data and related data are then correlated on the logic server 102 and transformed into a format usable by applications on the logic server 102.

In this example, the logic server 102 directly retrieves data comprising 100,000 records from core data 104, where a separate database call is issued for each of the retrieved records. This means that 100,000 calls to the database server 103 are performed to retrieve the 100,000 records. In addition to the core data, the logic server 102 may need to retrieve data from each of the seven views from related data 105 for each record retrieved from the core data 104. As with the core data, retrieving the records directly from the related data 105 may require individual database operations for each record retrieved, resulting in 700,000 additional database calls. As a result, a total of 800,000 database calls may need to be placed to the database server 103 to retrieve the required information. Clearly, the accumulation of time and expense needed to perform such a large number of database calls to retrieve and transfer data between logic server 102 and database server 103 can have a significant impact on performance.

As is evident, time of communication between the database server and logic server may cause performance issues when the transfer of data between the two devices is done in an inefficient manner.

Therefore, embodiments of the invention provide an improved approach to retrieve and transfer data between a logic server and a database server. In some embodiments, the invention improves efficiency by significantly reducing the number of database calls that need to be made between the logic server and the database server. In addition, the data to be retrieved from the database server is grouped together on the database server, so that it may be transferred to the logic server in a unitary batch instead of piecemeal.

This approach therefore minimizes the quantity of communications that is needed between the logic server and database server, where the approach harnesses the strengths of the database to stage the related data in such a way that it can be consumed by the logic server in the most efficient way possible. This is because buffered optimizations allow for more efficient transfer of data between a database server and a logic server so that a single operation transferring a large number of records is more efficient compared to transferring data using multiple smaller operations, even if the total number of records being transferred is the same. In some embodiments, the database may also be able to transform and manipulate data internally more efficiently than the logic server. Thus it may be desirable to have major operations such as the collation of data to take place within the database server.

Figure 2:
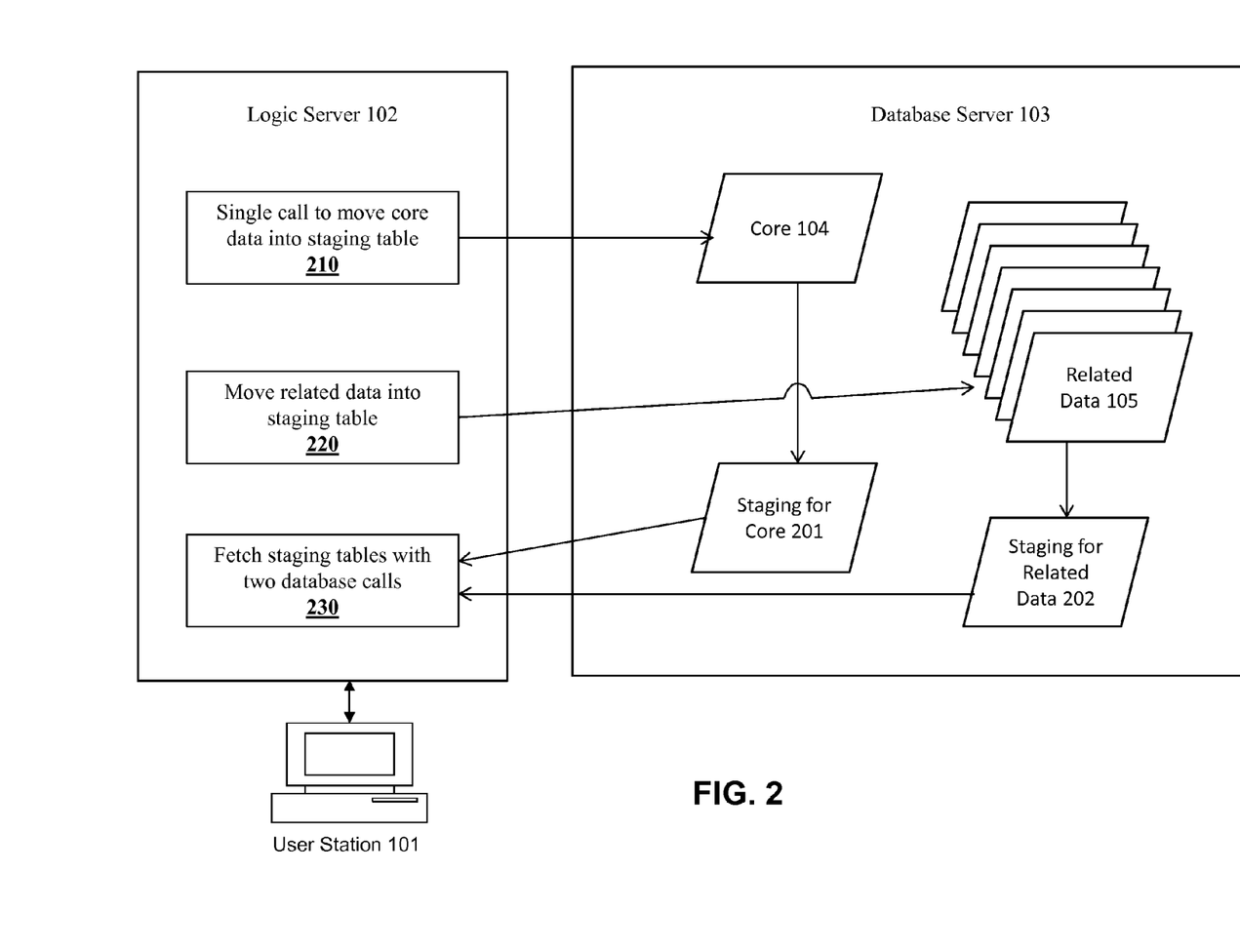
FIG. 2 illustrates an example of a system for retrieving core and related data from a database in accordance with embodiments of the invention.

FIG. 2 illustrates an example system for retrieving core and related data according to certain embodiments of the invention. The system improves performance by taking advantage of capabilities of the database server 103 to move data internally to staging locations and into predefined formats so that it can be transferred to the logic server 102 using fewer database operations.

In this approach, logic server 102 at 210, instead of retrieving core data 104 from database server 103 directly, issues a single call to the database server 103 to retrieve the requested data (e.g., by using issuing and executing a single SQL query). The data may be retrieved from core 104 and placed into a staging table 201. In some embodiments, data from core 104 is transformed before being placed in staging area 201. The application on the logic server 102 requesting the data may consume the data in a different format from how it is stored in the database server 103, and so the core data 104 may be transformed into the format used by the logic server before being placed in the staging table 201. For example, the application on the logic server may require that employee name data be in a "last name, first name" format, while the employee names may be stored differently on the database server. In some embodiments, the transformation may include calculations performed on the retrieved data. For example, the database server may store the monthly salary of an employee, whereas the logic server application displays a yearly salary. In this case the transformation may comprise multiplying the retrieved monthly salary data by 12 to compute the yearly salary.

Next, logic server 102 at 220 performs database calls to retrieve data from each of the views in related data 105. Unlike the approach of FIG. 1 which required a separate call to each data source to retrieve a separate item of data, the approach of FIG. 2 issues single calls to retrieve a plurality of the data items from each of the additional data sources (e.g., by using issuing and executing a single SQL query to each data source). The data may be retrieved from related data 105 and placed into a second staging table 202. As with the core data, the process of moving the data from related data 105 to staging table 202 may also involve transformations of the data. The related data 105 from the plurality of views may be combined and transformed to a common form that aligns with the form of the transformed core data stored in staging table 201. For example, in some embodiments, one view may comprise a table of salaries indexed by employee name, but another view may comprise a different table comprising office telephone number data that is indexed by area code. The retrieved records from these two views may be transformed into a common format so that they can be combined in the staging table, wherein the common format is the same as the format of the transformed core data in staging table 201. The combined and transformed data is then placed into staging table 202. In some embodiments, different core data points may be related with different number of related data points. The transformation allows for the related data to be formed in the same order as the core data in staging table 201.

Once the data has been transformed and placed in staging tables 201 and 202, the data may then be transferred to the logic server 102. This may be accomplished at 230 by issuing a single database call to each staging table. Because the core data and the related data have already been aligned by the transformations, combining the data in the logic server is much simpler and more efficient than if the logic server had received the untransformed data directly from core and related data 104 and 105. Even though the same amount of data is being transferred between the database server 103 and the logic server 102, optimizations for handling large data sizes in a single database transaction allow for the transfer to have higher efficiency and better performance than using individual transactions for each record. Once all the data has been transferred, the data may be consumed by applications running on the logic server 102.

Using this approach with the above example of retrieving core data comprising 100,000 records and seven views for each core record, a single database call is first issued to move and transform the 100,000 core records into a first staging table 201. For each data view, a single database call is issued to move and transform the records of the view into a second staging table 202, resulting in seven additional database calls. Once the data has been transformed and moved into the two staging tables, the entire data set can be accessed with two database operations (one for each staging table), taking advantage of buffered optimizations between the logic server and the database. The result is that the same scenario that previously required 800,000 distinct database operations to access the data set now will only require 10 database operations.

The system illustrated in FIG. 2 may contain one or more users at one or more user stations 101. The users operate the system from the user station to access the applications on logic server 102, such as ERP applications, which in turn retrieve data from database server 103. The user station 101 comprises any type of computing station that may be used to operate or interface with the application server. Examples of such user stations include for example, workstations, personal computers, laptop computers, or remote computing terminals. The user station 101 may comprise a display device, such as a display monitor or screen, for displaying interface elements and report data to the user. The user station 101 may also comprise one or more input devices for the user to provide operational control over the activities of the system, such as a mouse, touch screen, keypad, or keyboard. The users of the user station 101 correspond to any individual, organization, or other entity that uses system to access the ERP applications on server 102.

The database server 103 may correspond to any type of computer readable mediums or storage devices. The computer readable storage devices comprise any combination of hardware and software that allows for ready access to the data within the database. For example, the computer readable storage device could be implemented as computer memory or disk drives operatively managed by an operating system.

Figure 3:
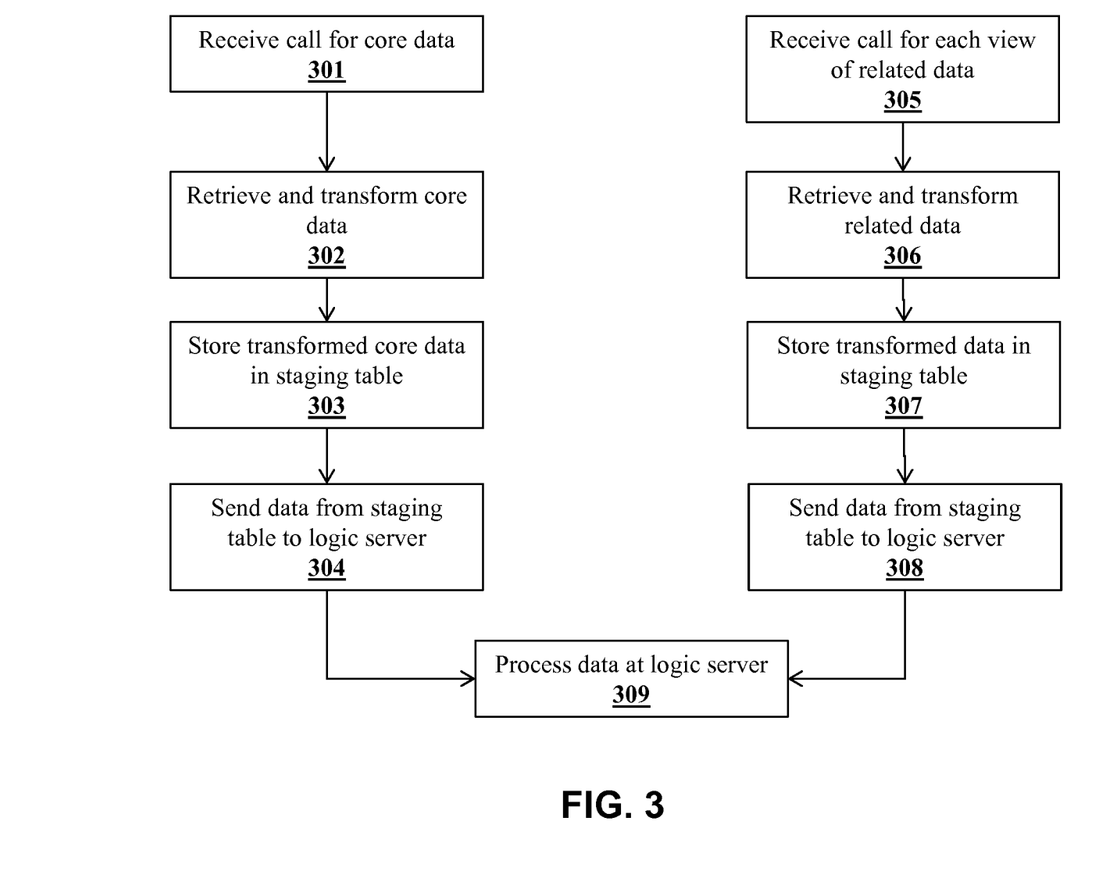
FIG. 3 illustrates a flowchart of a process used to retrieve the core and related data in accordance with embodiments of the invention.

FIG. 3 illustrates a flowchart of a process for retrieving core and related data from a database server to a logic server while minimizing the number of database operations, in accordance with certain embodiments of the invention. At 301, the database server receives a single database call from the logic server to retrieve a plurality of data items from the core data. In some embodiments, the database call may be in the form of a single SQL query.

At 302, core data in the database server is retrieved and transformed in response to the single database call from 301. The database call from the logic server specifies which data records are to be retrieved and may also define the data format that is used by the application on the logic server 102. The transformation of the core data may comprise transforming the data into a format defined by the database call or to a predefined format. At 303, the transformed core data is stored in a staging table in the database server.

At 304, the stored core data at the staging table is sent to the logic server. This may be in response to a call from the logic server. Because all of the core data is included in a single staging table, it may be sent to the logic server using a single database call from the logic server, resulting in better performance compared to sending the data to the server piecemeal using multiple calls.

Each core data record may have associated related data, e.g., a plurality of additional related views for the core data, which may be stored in separate tables in the database, or be different views of the same table. At 305, the database server receives a single database call from the logic server for each additional view to be retrieved. In some embodiments, each database call may be in the form of a single SQL query to each data source.

At 306, data for each of the data views in the related data is retrieved and transformed in response to the database calls. The data from the different views may be combined and transformed into a format usable by the application on the logic server. In some embodiments, the combined data from the data views is aligned with the data retrieved from the core data. Once the transformation is complete, the transformed related data is stored in a staging table in the database server at 307.

At 308, the related data stored at the staging table is sent to the logic server. As in 304, this may be in response to a call from the logic server. Because all of the related data comprising a plurality of data views is included in a single staging table, it can be sent to the logic server using a single database call, resulting in better performance compared to sending the data to the server piecemeal using multiple calls.

At 309, once the logic server has received both the core and related data from the databases server, applications on the logic server, such as ERP applications, are able to consume and process the data to be used by a user at a user station.

It will be appreciated that the order of the steps in the process may be different from that described above. For example, in some embodiments both the core and related data may be transformed and stored in staging tables before any transfer of data to the logic server occurs. In some embodiments, the core data and the related data may be combined in a single staging table at the database server, and transferred to the logic server using a single database call.

Figure 4:
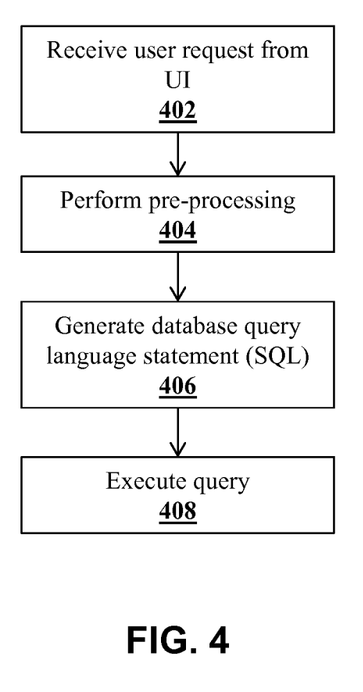
FIG. 4 illustrates a flowchart of an approach to generate the single database statement to query the core data according to some embodiments of the invention.

FIG. 4 illustrates a flowchart of an approach to generate the single database statement to query the core data according to some embodiments of the invention. At 402, a request for information is received from the user using a user interface (UI). The UI may be used to specify the exact set of data sought by the user, e.g., by selecting certain specific items and/or categories of data using the UI. In addition, the user may specify the data presentation for the display/presentation to the user, e.g., by selecting from among a set of configured display formats. As an illustrative example, the user may seek to access data for a given set of one or more projects from an ERP system, where the project data may include information from a core database (e.g., accounting ledger for the project(s)), as well as a set of related data from one or more additional data sources (e.g., data related to the ledger data such as financial, invoice, sales, account receivables, account payable data). The user may seek to retrieve the data, to perform calculations upon that data, and to then have that data displayed in a particular format to the user. For many large companies, such data may include a very large quantity of data items from both the core data and the multiple sets of related data, potentially including upwards of many tens or hundreds of thousands of items from each source (or even millions of items for very large projects).

In many cases, the UI is usable by the user to interactively request information from an enterprise reporting application that requires the underlying data to be obtained from a backend database server and/or data warehouse. In this situation, the interactive nature of the request makes the approach of FIG. 1 unacceptable due to the excessive amounts of time required before results are displayed to the user, especially when the user request pertains to a large amount of requested data. With the present embodiment of the invention, these problems are obviated, since a single request can be generated to fetch the data from the core database and to place that data into a staging area.

At 404, preprocessing is performed upon the user request. The pre-processing step is performed to review the request made by the user in the UI, and to then identify the various parameters and information that is needed and/or used to generate the single request to the core database. This action identifies, for example, the parameters that should be used to query against the core database. In the situation where the core database pertains to an accounting ledger and the user request pertains to data pertinent to one or more projects, the parameters identified by the pre-processing action may include for example, various properties of the accounting ledger pertaining to the user request such as data ranges, project ranges or identifiers, account numbers, sub-ledgers, and the like.

Next, at 406, the database query language statement (e.g. SQL statement) is generated to query against the core database table(s). This action configures the various portions of the SQL statement. The pre-processing action should have already identified the data to be requested from the core database tables. As such, the present action analyzes the data to be requested, the data sources for the data, and also the format of the resulting output to the staging table. This permits generation of a SQL statement that identifies the correct set of columns from the specific tables where the data is to be retrieved (e.g., to generate the first portion of the SQL statement of a form such as "SELECT [specific_columns or *] FROM core_tables . . . ").

The predicate within the SQL statement is also configured at this point using identified parameters for the user request. For example, if the user request pertains to a specified date range, account number(s), and/or sub-ledgers, then the predicate in the SQL statement may include a WHERE clause that limits/filters the results to the specified data range, account number(s), and/or sub-ledger IDs, respectively.

In addition, the SQL statement can be configured to format the data output to the staging table. Any suitable format may be generated for the data output, e.g., as described earlier in this document.

Any suitable procedure may be performed to generate the SQL statement. In one approach, the various portions of the SQL statement is generated by analyzing the exact requirements of the user request, and to build each portion of the SQL statement to account for the requirements of the user request. A set of rules may be implemented that identify specific aspects of the user request, where the rules identify the actions to take to create a corresponding portion of the SQL statement upon encountering identified patterns/requests in the user request. Alternatively, pre-configured statements, SQL portions, and/or templates may be employed to generate the SQL statement by matching the specific aspects of the user request to one or more of the pre-configured statement portions and/or templates. These pre-configured statement portions and/or templates may also be customized as necessary to address specific aspects of the user request.

Thereafter, at 408, the SQL query is sent to the database server and executed. The query is executed to obtain the requested data from one or more of the core database tables. The retrieved data is then formatted as necessary and then placed into the one or more core staging tables.

Figure 5A:
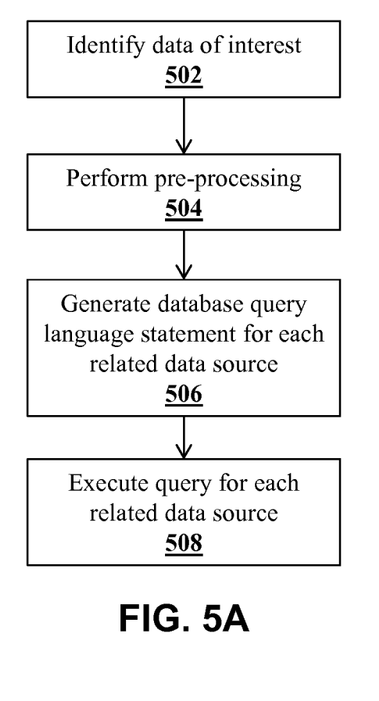
FIG. 5A illustrates a flowchart of an approach to generate the single database statements to query each of the related data sources.

FIG. 5A illustrates a flowchart of an approach to generate the single database statements to query each of the related data sources. The general situation to be addressed is that the user request may seek data that is outside of the core database tables. To explain, consider again the scenario where the core database pertains to a set of accounting ledger data. The user request may also seek to obtain certain information that only exists in other data sources, such as customer billing/invoicing, receivables, and/or payables data that relate to project data in the main accounting ledger. These data items in the other data sources may, for example, be maintained by separate business entities using entirely separate sets of processing objects/tables.

To address this situation, database query language statements (e.g., SQL statements) are generated to retrieve the additional information from the related data sources. This process begins, at 502, by identifying the data of interest. From the initial request for information received from the user using the user interface (UI), identification can be made of the data outside of the core data tables for which information is sought. For example, the UI may have been used by the user to specify a set of data to be displayed along with a particular data presentation format, where the set of data includes information not in the core tables.

A preprocessing action is performed at 504 for the user request. The pre-processing step is performed to review the request made by the user in the UI, and to then identify the various parameters and information beyond the core tables that is needed and/or used to generate the requests to the related database. This action identifies, for example, a specific set of related database tables to be queried as well as the parameters that should be used to query against the related database tables.

Next, at 506, the database query language statement (e.g. SQL statement) is generated to query against the related database table(s). This action configures the various portions of the various SQL statements using information obtained through the pre-processing actions (which should have already identified the data to be requested from the related database tables).

This action therefore is performed to create a separate SQL statement for each of the related sources, by analyzing the data to be requested, the related data sources for the data, and also the format of the resulting output to the staging table. This permits generation of a separate SQL statement for each related source that identifies the correct set of columns from the related source tables and/or views that already exist or need to be created. In addition, the predicate within the SQL statements is also configured at this point using identified parameters for the user request. The SQL statement can be configured to format the data output to the staging table.

As before, any suitable procedure may be performed to generate the SQL statement. For example, the SQL statement can be generated by analyzing the exact requirements of the user request, and by building each portion of the SQL statement to account for the requirements of the user request.

A set of rules may be implemented that identify specific aspects of the user request, where the rules identify the actions to take to create a corresponding portion of the SQL statement upon encountering identified patterns/requests in the user request. Alternatively, pre-configured statements, SQL portions, and/or templates may be employed to generate the SQL statement by matching the specific aspects of the user request to one or more of the pre-configured statement portions and/or templates. These pre-configured statement portions and/or templates may also be customized as necessary to address specific aspects of the user request.

Thereafter, at 508, the individual SQL query statements are sent to the respective related data sources to be executed. Each query is executed at a related data source to obtain the requested data from one or more of the related database tables/views.

Figure 5B:
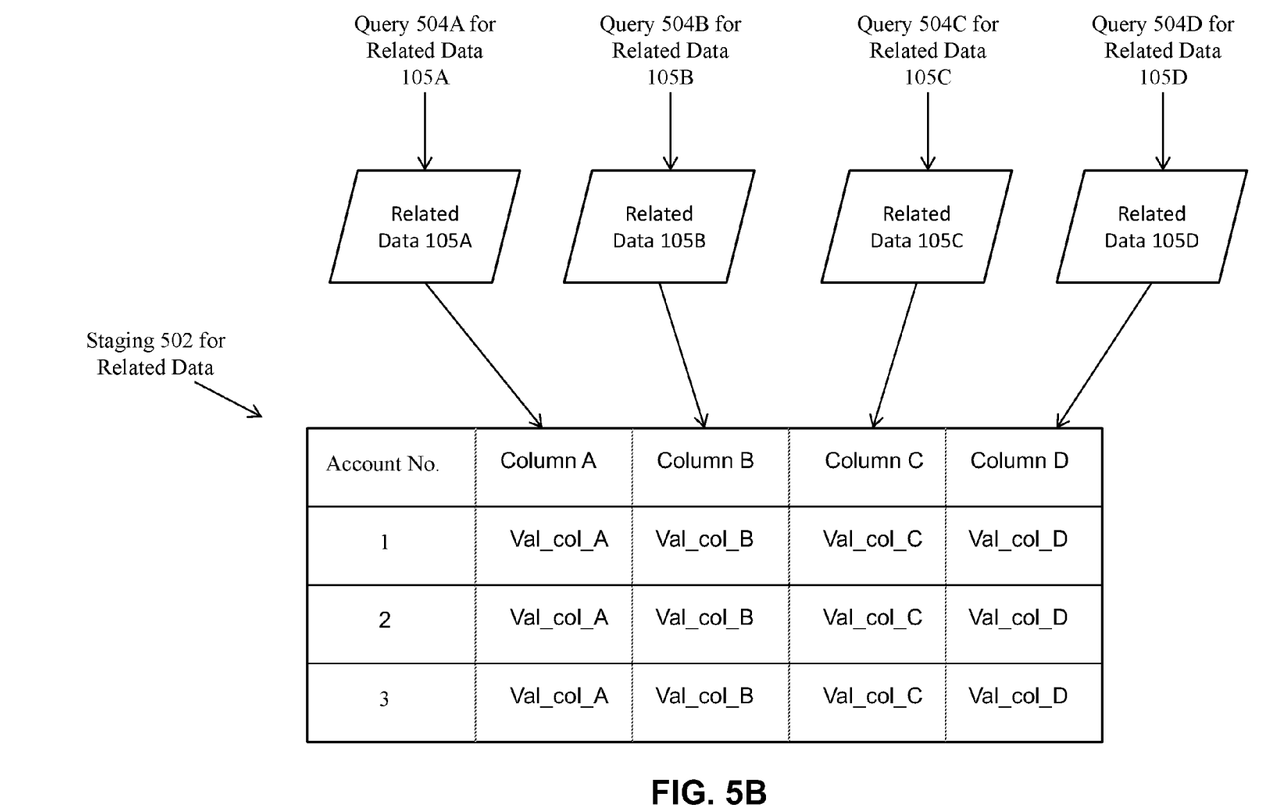
FIG. 5B illustrates this process for issuing queries to the related data sources and for placing the retrieved data into a staging table.

FIG. 5B illustrates this process for issuing queries to the related data sources and for placing the retrieved data into a staging table 502. This figure illustrates the scenario where a first query 504A is used to query against a first set of related data 105A, a second query 504B is used to query against a second set of related data 105B, a third query 504C is used to query against a third set of related data 105C, and a fourth query 504D is used to query against a fourth set of related data 105D.

It is noted that this example illustrates where a separate query 504A-D has been generated that is specific for each of the related data sources 105A-D, which pertains the specific set of data to be retrieved from the related data sources 105A-D.

The retrieved data from the related data sources is formatted as necessary and then placed into staging table 502. The formatting specifically illustrated in FIG. 5B pertains to the placement of the data from the data sources into the appropriate columns within the staging table 502. Here, the data from data source 105A is placed into Column A, data from data source 105B is placed into Column B, data from data source 105C is placed into Column C, and data from data source 105D is placed into Column D.

One reason for this type of formatting is to effect calculations that may need to be made between the values received from the different data sources. For example, the user may seek to perform certain mathematical operations (e.g., calculation of percentages, averaging, differences, sorting, etc.) using the values from the different data sources, where the data needs to be precisely placed into designated columns to effect the calculations.

Figure 6:
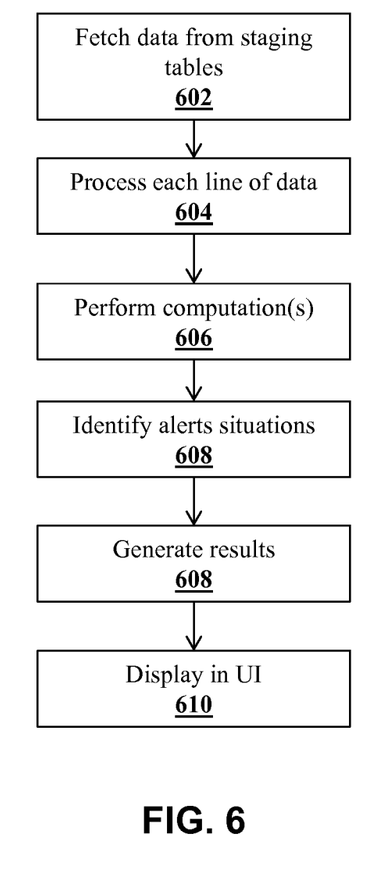
FIG. 6 illustrates an approach to fetch data from the core staging table and the related data staging table.

Once the appropriate set of data has been placed into the core staging table and the related data staging table, these values can then be fetched to the logic server for processing. FIG. 6 shows a flowchart of an approach to perform this process in some embodiments of the invention. At 602, the data within the staging tables are fetched from the staging tables at the database server to the logic server. As previously noted, since the data has been collected into two staging tables, only two requests need to be sent to retrieve this data (one for each staging table), regardless of how many rows of data exist in these tables.

At 604, the retrieved data is processed by the logic server. In one embodiment each line of retrieved data is separately processed by the logic server. At 606, any computation requested by the user is performed upon the retrieved data. This is one reason for making sure the data is properly formatted in the staging table, since computations may be performed upon the retrieved data in reliance upon the data being properly formatted (e.g., being in the appropriate columns to support column-based calculations).

At 608, the retrieved data is reviewed to determine if any alerts need to be raised for the data. For example, the user may have configured one or more alerts that check for the presence of certain data situations, e.g., where certain data values exceed threshold data values established for the alert rules. If these data situations are identified, then an alert may be issued to signal the alert to the user, e.g., using a visual alert indicator. Techniques for defining and configuring alerts are further described in U.S. patent application Ser. No. 14/188,341, entitled "PROJECT MANAGEMENT ALERTS USING HETEROGENEOUS PROJECT DATA", filed on Feb. 24, 2014, which is hereby incorporated by reference in its entirety.

At 608, the retrieved data is formatted as appropriate for the data presentation selected by the user. For example, the user's selected data presentation may have designated the data results to be organized in a certain format or ordering (e.g., in a chart). This step takes the retrieved data and formats the data as requested by the user. Thereafter, at 610, the formatted data is displayed to the user in a user interface.

Therefore, what has been described is an improved approach for retrieving data from a database server, wherein the amount of necessary database operations is reduced due to staging and collating of data within the database before transferring the data to the server, instead of directly retrieving the data from the database. This approach provides substantial performance improvements when gathering and processing large volumes of data from a database server to be sent to a logic server. This technique can be used, for example, to efficiently implement on-demand data warehouses.

System Architecture Overview

Figure 7:
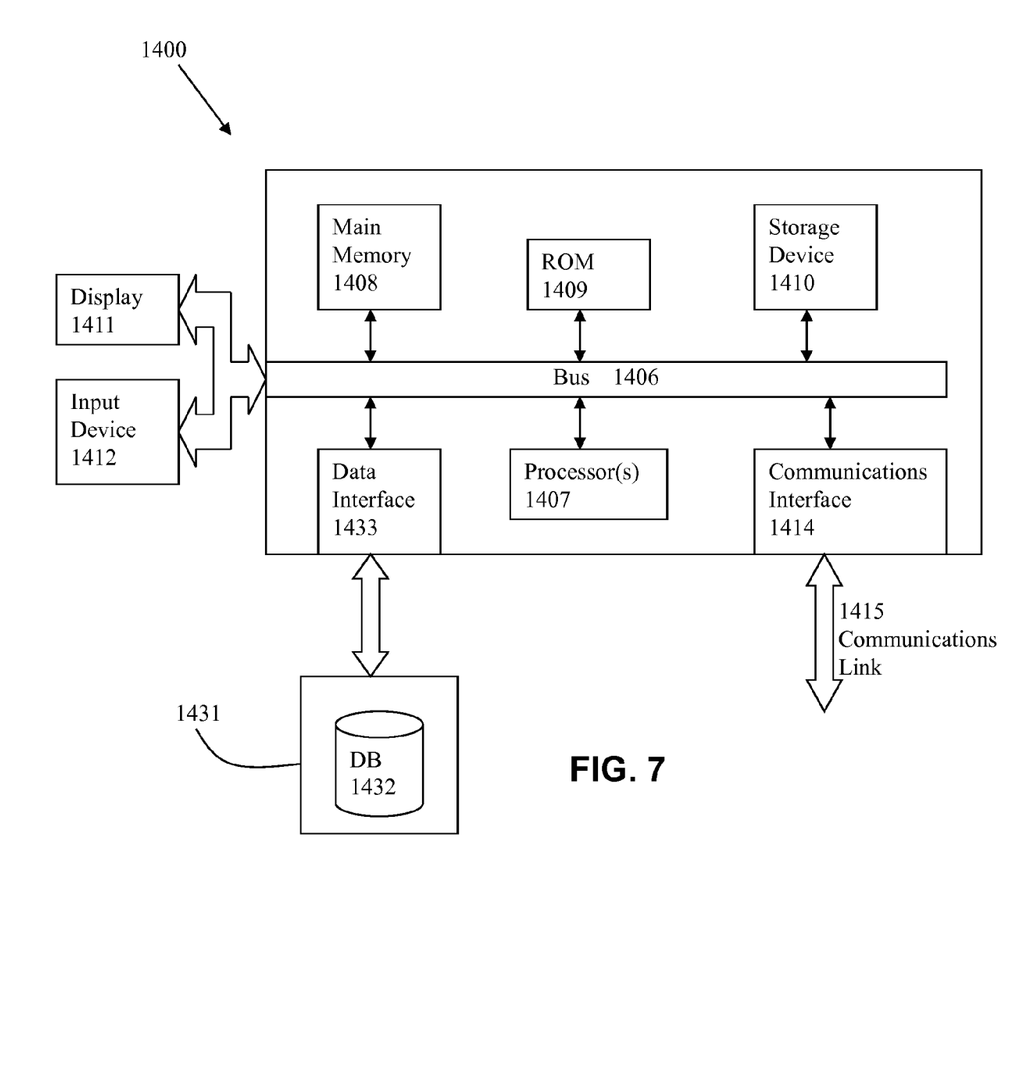
FIG. 7 illustrates a computerized system on which an embodiment of the invention can be implemented.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor for transferring a plurality of data to a server from a database, the plurality of data retrieved by querying core data and a plurality of database views associated with the core data, the method comprising:
   receiving a request for information from a user via a user interface, the request specifying the plurality of data and a first format for displaying the plurality of data;
   identifying one or more parameters required to generate a first single database call to retrieve a first set of data from one or more tables in the database based on the request for information received from the user;
   identifying one or more sources of the core data and a second format of an output of the first set of data to request from the core data to a first staging table;
   identifying one or more columns from the one or more tables in the database from which the first set of data is to be retrieved;
   sending the first single database call from the server to the database requesting the first set of data from the core data;
   moving the first set of data requested from the core data to the first staging table within the database in response to the first single database call;
   identifying one or more additional parameters required to generate one or more additional database calls to retrieve a second set of data to request from the plurality of database views from one or more additional tables in the database based on the request for information received from the user, wherein the plurality of database views comprise data stored in separate tables or the data stored in a single table;
   identifying one or more additional sources of the plurality of database views and a third format of an additional output of the second set of data to request from the plurality of database views to a second staging table;
   generating the one or more additional database calls to request the second set of data requested from the plurality of database views based at least in part on the one or more additional sources of the plurality of database views and the third format, the one or more additional database calls identifying one or more additional columns from the one or more additional tables from which the second set of data to request from the plurality of database views is to be retrieved and configured to format the second set of data requested from the plurality of database views output to the second staging table, the additional database calls comprising a single SQL query, wherein generating the one or more additional database calls to request the second set of data from the plurality of database views is further based at least in part on one or more selected from a group consisting of: a rule associating a portion of an SQL statement with an aspect of the request for information received from the user, one or more preconfigured portions of SQL statements, and one or more SQL templates;
   sending the one or more additional database calls from the server to the database requesting the second set of data from the plurality of database views, each of the one or more additional database calls corresponding to an additional request for data from one database view of the plurality of database views, one or more records included in each of the plurality of database views corresponding to the one or more records comprising the core data;
   moving the second set of data requested from the plurality of database views to a second staging table within the database in response to the one or more additional database calls, the second staging table comprising at least a first column and a second column, each of the first column and the second column corresponding to a set of related data retrieved by querying a database view of the plurality of database views, such that a first set of related data retrieved by querying a first database view of the plurality of database views is placed into the first column and a second set of related data retrieved by querying a second database view of the plurality of database views is placed into the second column;
   formatting the first set of data requested from the core data and the second set of data requested from the plurality of database views into a fourth format or ordering selected by the user;
   transferring the first set of data requested from the core data from the first staging table in the database to the server in response to a second single database call sent from the server to the database;
   transferring the second set of data requested from the plurality of database views as a unit from the second staging table in the database to the server in response to a third single database call sent from the server to the database;
   consuming the first set of data requested from the core data and the second set of data requested from the plurality of database views, the first set of data requested from the core data and the second set of data requested from the plurality of database views consumed by an application running on the server, wherein the application running on the server comprises an Enterprise Resource Planning application;

determining whether to issue one or more alerts based on the first set of data requested from the core data and the second set of data requested from the plurality of database views, the one or more alerts configured to be issued upon identifying one or more data situations wherein the one or more data situations comprises a data value that exceeds a threshold value; and displaying the first set of data requested from the core data and the second set of data requested from the plurality of database views to the user in the user interface.

2. The method of claim 1, further comprising:
transforming the first set of data requested from the core data into a format used by the server before moving the first set of data requested from the core data to the first staging table.

3. The method of claim 1, wherein the first set of data requested from the core data in the first staging table and the second set of data requested from the plurality of database views in the second staging table are transformed to a same format.

4. The method of claim 1, wherein the core data and the plurality of database views are from separate tables in the database.

5. The method of claim 1, wherein moving one or more of the first set of data requested from the core data to the first staging table and the second set of data requested from the plurality of database views to the second staging table comprises transforming one or more of the first set of data requested from the core data and the second set of data requested from the plurality of database views into a format usable by the server.

6. The method of claim 1, further comprising:
combining the first set of data requested from the core data and the second set of data requested from the plurality of database views in a single staging table within the database; and transferring the first set of data requested from the core data and the second set of data requested from the plurality of database views as an additional unit from the single staging table within the database to the server in response to a single database call sent from the server to the database.

7. The method of claim 1, further comprising:
transforming the second set of data requested from the plurality of database views into a format used by the server before moving the second set of data requested from the plurality of database views to the second staging table.

8. The method of claim 5, wherein transforming one or more of the first set of data requested from the core data and the second set of data requested from the plurality of database views into a format usable by the server comprises performing one or more calculations on the one or more of the first set of data requested from the core data and the second set of data requested from the plurality of database views.

9. The method of claim 8, wherein the one or more calculations are performed to determine one or more of a percentage, an average, and a difference.

10. The method of claim 1, wherein an additional database call of the one or more additional database calls is generated by a process comprising:
pre-processing the request for information at the server to identify parameters for the additional database call; and generating a predicate for the additional database call using the identified parameters.

11. The method of claim 10, wherein the additional database call comprises a SQL statement and the SQL statement is constructed using at least one of preconfigured statements, rule-based predicate generation, and a template.

12. A system for transferring a plurality of data from a database to a server, the plurality of data retrieved by querying core data and a plurality of database views associated with the core data, the system comprising:
a processor; and
a memory to hold the program code instructions, in which the program code instructions comprises program code to perform:
receiving a request for information from a user via a user interface, the request specifying the plurality of data and a first format for displaying the data; identifying one or more parameters required to generate a first single database call to retrieve a first set of data from one or more tables in the database based on the request for information received from the user; identifying one or more sources of the core data and a second format of an output of the first set of data to request from the core data to a first staging table; identifying one or more columns from the one or more tables in the database from which the first set of data is to be retrieved; sending the first single database call from the server to the database requesting the first set of data from the core data; moving first set of data requested from the core data to the first staging table within the database in response to the first single database call; identifying one or more additional parameters required to generate one or more additional database calls to retrieve a second set of data to request from the plurality of database views from one or more additional tables in the database based on the request for information received from the user, wherein the plurality of database views comprise data stored in separate tables or the data stored in a single table; identifying one or more additional sources of the plurality of database views and a third format of an additional output of the second set of data to request from the plurality of database views to a second staging table; generating the one or more additional database calls to request the second set of data requested from the plurality of database views based at least in part on the one or more additional sources of the plurality of database views and the third format, the one or more additional database calls identifying one or more additional columns from the one or more additional tables from which the second set of data to request from the plurality of database views is to be retrieved and configured to format the second set of data requested from the plurality of database views output to the second staging table, the additional database calls comprising a single SQL query, wherein generating the one or more additional database calls to request the second set of data from the plurality of database views is further based at least in part on one or more selected from a group consisting of: a rule associating a portion of an SQL statement with an aspect of the request for information received from the user, one or more pre-configured portions of SQL statements, and one or more SQL templates; sending the one or more additional database calls from the server to the database requesting the second set of data from the plurality of database views, each of the one or more additional database calls corresponding to an additional request for data from one database view of the plurality of database views, one or more records included in each of the plurality of database views corresponding to the one or more records comprising the core data; moving the second set of data requested from the plurality of database views to a second staging table within the database in response to the one or more additional database calls, the second staging table comprising at least a first column and a second column, each of the first column and the second column corresponding to a set of related data retrieved by querying a database view of the plurality of database views, such that a first set of related data retrieved by querying a first database view of the plurality of database views is placed into the first column and a second set of related data retrieved by querying a second database view of the plurality of database views is placed into the second column; formatting the first set of data requested from the core data and the second set of data requested from the plurality of database views into a fourth format or ordering selected by the user; transferring the first set of data requested from the core data from the first staging table in the database to the server in response to a second single database call sent from the server to the database; transferring the second set of data requested from the plurality of database views as a unit from the second staging table in the database to the server in response to a third single database call sent from the server to the database; consuming the first set of data requested from the core data and the second set of data requested from the plurality of database views, the first set of data requested from the core data and the second set of data requested from the plurality of database views consumed by an application running on the server, wherein the application running on the server comprises an Enterprise Resource Planning application; determining whether to issue one or more alerts based on the first set of data requested from the core data and the second set of data requested from the plurality of database views, the one or more alerts configured to be issued upon identifying one or more data situations wherein the one or more data situations comprises a data value that exceeds a threshold value; and displaying the first set of data requested from the core data and the second set of data requested from the plurality of database views to the user in the user interface.

13. The system of claim 12, wherein the program code instructions further comprise program code to perform:
transforming the first set of data requested from the core data into a format used by the server before moving the first set of data requested from the core data to the first staging table.

14. The system of claim 12, wherein the first set of data requested from the core data in the first staging table and the second set of data requested from the plurality of database views in the second staging table are transformed to a same format.

15. The system of claim 12, wherein the core data and plurality of database views are from separate tables in the database.

16. The system of claim 12, wherein moving one or more of the first set of data requested from the core data to the first staging table and the second set of data requested from the plurality of database views to the second staging table comprises transforming one or more of the first set of data requested from the core data and the second set of data requested from the plurality of database views into a format usable by the server.

17. The system of claim 12, wherein the program code instructions further comprise program code to perform:
combining the first set of data requested from the core data and the second set of data requested from the plurality of database views in a single staging table within the database; and
transferring the first set of data requested from the core data and the second set of data requested from the plurality of database views as an additional unit from the single staging table within the database to the server in response to a single database call sent from the server to the database.

18. The system of claim 12, wherein the program code instructions further comprise program code to perform:
transforming the second set of data requested from the plurality of database views into a format used by the server before moving the second set of data requested from the plurality of database views to the second staging table.

19. The system of claim 16, wherein transforming one or more of the first set of data requested from the core data and the second set of data requested from the plurality of database views into a format usable by the server comprises performing one or more calculations on the one or more of the first set of data requested from the core data and the second set of data requested from the plurality of database views.

20. The system of claim 19, wherein the one or more calculations are performed to determine one or more of a percentage, an average, and a difference.

21. The system of claim 12, wherein an additional database call of the one or more additional database calls is generated by a process comprising:
pre-processing the request for information at the server to identify parameters for the additional database call; and
generating a predicate for the additional database call using the identified parameters.

22. The system of claim 21, wherein the additional database call comprises a SQL statement and the SQL statement is constructed using at least one of preconfigured statements, rule-based predicate generation, and a template.

23. A computer program product including a non-transitory computer readable medium having instructions which, when executed by a processor, causes the processor to perform a process for transferring a plurality of data from a database to a server, the plurality of data retrieved by querying core data and a plurality of database views associated with the core data, the process comprising:
receiving a request for information from a user via a user interface, the request specifying the plurality of data and a first format for displaying the plurality of data;
identifying one or more parameters required to generate a first single database call to retrieve a first set of data from one or more tables in the database based on the request for information received from the user;
identifying one or more sources of the core data and a second format of an output of the first set of data to request from the core data to a first staging table;
identifying one or more columns from the one or more tables in the database from which the first set of data is to be retrieved;
sending the first single database call from the server to the database requesting the first set of data from the core data;

moving the first set of data requested from the core data to the first staging table within the database in response to the first single database call;

identifying one or more additional parameters required to generate one or more additional database calls to retrieve a second set of data to request from the plurality of database views from one or more additional tables in the database based on the request for information received from the user, wherein the plurality of database views comprise data stored in separate tables or the data stored in a single table;

identifying one or more additional sources of the plurality of database views and a third format of an additional output of the second set of data to request from the plurality of database views to a second staging table;

generating the one or more additional database calls to request the second set of data requested from the plurality of database views based at least in part on the one or more additional sources of the plurality of database views and the third format, the one or more additional database calls identifying one or more additional columns from the one or more additional tables from which the second set of data to request from the plurality of database views is to be retrieved and configured to format the second set of data requested from the plurality of database views output to the second staging table, the additional database calls comprising a single SQL query, wherein generating the one or more additional database calls to request the second set of data from the plurality of database views is further based at least in part on one or more selected from a group consisting of: a rule associating a portion of an SQL statement with an aspect of the request for information received from the user, one or more preconfigured portions of SQL statements, and one or more SQL templates;

sending the one or more additional database calls from the server to the database requesting the second set of data from the plurality of database views, each of the one or more additional database calls corresponding to an additional request for data from one database view of the plurality of database views, one or more records included in each of the plurality of database views corresponding to the one or more records comprising the core data;

moving the second set of data requested from the plurality of database views to a second staging table within the database in response to the one or more additional database calls, the second staging table comprising at least a first column and a second column, each of the first column and the second column corresponding to a set of related data retrieved by querying a database view of the plurality of database views, such that a first set of related data retrieved by querying a first database view of the plurality of database views is placed into the first column and a second set of related data retrieved by querying a second database view of the plurality of database views is placed into the second column;

formatting the first set of data requested from the core data and the second set of data requested from the plurality of database views into a fourth format or ordering selected by the user;

transferring the first set of data requested from the core data from the first staging table in the database to the server in response to a second single database call sent from the server to the database;

transferring the second set of data requested from the plurality of database views as a unit from the second staging table in the database to the server in response to a third single database call sent from the server to the database;

consuming the first set of data requested from the core data and the second set of data requested from the plurality of database views, the first set of data requested from the core data and the second set of data requested from the plurality of database views consumed by an application running on the server, wherein the application running on the server comprises an Enterprise Resource Planning application;

determining whether to issue one or more alerts based on the first set of data requested from the core data and the second set of data requested from the plurality of database views, the one or more alerts configured to be issued upon identifying one or more data situations wherein the one or more data situations comprises a data value that exceeds a threshold value; and displaying the first set of data requested from the core data and the second set of data requested from the plurality of database views to the user in the user interface.

24. The computer program product of claim 23, wherein the process further comprises:
transforming the first set of data requested from the core data into a format used by the server before moving the first set of data requested from the core data to the first staging table.

25. The computer program product of claim 23, wherein the first set of data requested from the core data in the first staging table and the second set of data requested from the plurality of database views in the second staging table are transformed to a same format.

26. The computer program product of claim 23, wherein the core data and the plurality of database views are from separate tables in the database.

27. The computer program product of claim 23, wherein moving one or more of the first set of data requested from the core data to the first staging table and the second set of data requested from the plurality of database views to the second staging table comprises transforming one or more of the first set of data requested from the core data and the second set of data requested from the plurality of database views into a format usable by the server.

28. The computer program product of claim 23, wherein the process further comprises:
combining the first set of data requested from the core data and the second set of data requested from the plurality of database views in a single staging table within the database; and
transferring the first set of data requested from the core data and the second set of data requested from the plurality of database views as an additional unit from the single staging table within the database to the server in response to a single database call sent from the server to the database.

29. The computer program product of claim 23, wherein the process further comprises:
transforming the second set of data requested from the plurality of database views into a format used by the server before moving the second set of data requested from the plurality of database views to the second staging table.

30. The computer program product of claim 27, wherein transforming one or more of the first set of data requested from the core data and the second set of data requested from the plurality of database views into a format usable by the server comprises performing one or more calculations on the one or more of the first set of data requested from the core data and the second set of data requested from the plurality of database views.

31. The computer program product of claim 30, wherein the one or more calculations are performed to determine one or more of a percentage, an average, and a difference.

32. The computer program product of claim 23, wherein an additional database call of the one or more additional database calls is generated by a process comprising:
   pre-processing the request for information at the server to identify parameters for the additional database call; and
   generating a predicate for the additional database call using the identified parameters.

33. The computer program product of claim 32, wherein the additional database call comprises a SQL statement and the SQL statement is constructed using at least one of preconfigured statements, rule-based predicate generation, and a template.

* * * * *

UNITED STATES PATENT AND TRADEMARK OFFICE
CERTIFICATE OF CORRECTION

PATENT NO. : 9,864,789 B2
APPLICATION NO. : 14/247993
DATED : January 9, 2018
INVENTOR(S) : Nowakowski et al.

Page 1 of 1

It is certified that error appears in the above-identified patent and that said Letters Patent is hereby corrected as shown below:

In the Claims

In Column 14, Line 29, in Claim 12, after "moving" insert -- the --.

In Column 15, Line 36, in Claim 12, delete "server," and insert -- server; --, therefor.

Signed and Sealed this
Seventeenth Day of July, 2018

Andrei Iancu
*Director of the United States Patent and Trademark Office*